United States Patent [19]

Kitayama et al.

[11] Patent Number: 5,362,779
[45] Date of Patent: Nov. 8, 1994

[54] DAMPENING WATER COMPOSITION

[75] Inventors: Takuo Kitayama; Isamu Setoguchi, both of Tokyo, Japan

[73] Assignees: Dai Nippon Printing Co., Ltd., Tokyo; Kabushiki Kaisha Nichinan Kagaku, Saitama, both of Japan

[21] Appl. No.: 984,200

[22] Filed: Dec. 2, 1992

[30] Foreign Application Priority Data

Dec. 2, 1991 [JP] Japan ................... 3-341816

[51] Int. Cl.$^5$ ............... C08K 5/15; C08K 5/05; G03C 5/00
[52] U.S. Cl. ...................... 524/56; 524/379; 430/331
[58] Field of Search .............. 524/56, 57, 317, 377, 524/379, 55; 430/331

[56] References Cited

U.S. PATENT DOCUMENTS 4,734,132 3/1988 Yoshida .................. 430/104
5,064,749 11/1991 Matsumoto et al. .......... 430/331

Primary Examiner—Paul R. Michl
Assistant Examiner—LaVonda DeWitt
Attorney, Agent, or Firm—Fish & Richardson

[57] ABSTRACT

A dampening water composition which is inexpensive and which does not contaminate working environment as well as exterior environment wherein the dampening water composition comprising water, a pH buffering agent, a water-soluble polymer and n-propyl alcohol, wherein at least a portion of the water-soluble polymer comprises pullulan.

4 Claims, No Drawings

DAMPENING WATER COMPOSITION

BACKGROUND OF THE INVENTION

This invention relates to a dampening water or fountain solution composition, and more particularly to a dampening water composition not containing the isopropyl alcohol universally used in the prior art wherein the tinting and scumming of the printed matter and various other difficulties do not arise.

Heretofore, various printing processes have been widespread. Of these processes, the most widely used process is the lithographic printing (offset) process.

In this lithographic printing process, there is used a machine plate wherein a lipophilic printing area on which a printing ink composition deposits and a hydrophilic non-image area on which the printing ink composition does not deposit are formed on the surfaces of materials such as presensitized aluminum plates by a photomechanical process. This machine plate is wound around the plate cylinder of a printing machine and brought into contact with an ink roller to feed the printing ink composition from the ink roller to the machine plate. A solution called a dampening water has been previously applied to the machine plate so that the ink composition deposits only on the printing area without depositing on the non-image area. This solution is present on the non-image area in the form of a uniformly thin water film. This film of dampening water inhibits the deposition of the ink composition on the non-image area.

It is required that such a dampening water has a proper surface tension and therefore an aqueous solution of isopropyl alcohol having a concentration of from 5% to 20% by weight has heretofore been used.

However, this isopropyl alcohol has been regulated by a revision of labor safety so that the concentration of isopropyl alcohol in an aqueous solution must be less than 5% by weight. There is a high probability that isopropyl alcohol must be used at the lower concentration in the future. If the concentration of isopropyl alcohol in the dampening water composition is less than 5% by weight, the performance of the dampening water composition will be insufficient and satisfactory printed matter cannot be obtained. Further, substantially all of the dampening water composition eventually evaporates in the air. including its isopropyl alcohol, so the hazardous nature of isopropyl alcohol poses various problems such as working environment contamination as well as exterior environment contamination.

It is therefore an object of the present invention to provide a dampening water composition capable of giving a high quality printed matter without contamination working environment as well as exterior environment with isopropyl alcohol.

SUMMARY OF THE INVENTION

This object is achieved by the present invention described below. That is, the present invention relates to a dampening water composition comprising water, a pH buffering agent, a water-soluble polymer and n-propyl alcohol, wherein at least a portion of the water-soluble polymer is a natural polysaccharide pullulan) produced from a partially degraded product of starch by the black yeast called Aureobasidium pullulans. This yeast is one of the imperfect fungi, i.e., Deuteromycotina, Deuteromycetes or Fungi Imperfecti.

Working environment contamination and exterior environment contamination problems can be solved and printing can be carried out without occurring various troubles such as scumming by using n-propyl alcohol and a specific water-soluble polymer as components of the dampening water composition.

DETAILED DESCRIPTION OF THE INVENTION

A preferred embodiment will describe the present invention in more detail.

The components of the dampening water composition of the present invention are broadly divided into water which is a main medium; a pH buffering agent which keeps the pH of the dampening water composition constant; a water-soluble polymer which adjusts the viscosity of the dampening water composition, causing retention of a thin water film at the non-image area and which provides a desensitization effect; n-propyl alcohol which adjusts the surface tension and which prevents the emulsification of an offset ink composition; a polyhydric alcohol which adjusts the surface tension and humectation; and other optional additives such as preservatives. As the polyhydric alcohol, diethylene glycol, propylene glycol, 1,3-butylene glycol, hexylene glycol, polyethylene glycol, dipropylene glycol, and can preferably be used.

Water used in the present invention is any type of conventional water, e.g., industrial water, tap water, underground water, and distilled water. The water used in the present invention is not particularly restricted.

The pH buffering agent is used for the purpose of keeping the pH of the dampening water composition constant at from about 4.5 to 5.5 regardless of the kind of ink composition, printing press on environmental atmosphere. Any known pH buffering agent can be used, provided that it exerts such an effect. A pH buffering agent based on glucono-delta-lactone also termed (gluconic acid) is particularly preferred in the present invention. This gluconic acid adjusts the pH and acts as a cleaner for metal which gels the ink composition. A suitable example of the pH buffering agents includes a composition containing from 7 to 30 grams of citric acid, from 4 to 20 grams of sodium citrate, from 7 to 12 grams of ammonium phosphate, and from 7 to 12 grams of glucono-delta-lactone.

An essential water-soluble polymer is pullulan. It is preferred that other optional water-soluble polymers such as gum arabic, propylene oxide-ethylene oxide copolymers be used in combination with the pullulan. Other water-soluble starch derivatives; alginic acid; water-soluble cellulose derivatives such as carboxymethyl cellulose, carboxyethyl cellulose and hydroxyethyl cellulose; and synthetic water-soluble polymers such as polyvinyl alcohol, polyvinyl pyrrolidone and polyacrylamide can be used in combination with the pullulan as needed.

The pullulan is a natural neutral polysaccharide wherein maltotrioses are attached at regular intervals. The pullulan is water-soluble. It can be readily dissolved even in water containing n-propyl alcohol and other organic materials by using a dampening water composition having a specific composition. This pullulan has excellent properties: a bonding property against the plate surface in the present invention, a coating property and a water-retaining property. Its solution has a low viscosity, has no thixotropy and does not gel. It has been found that the pullulan be very useful as the water-soluble polymer of the dampening water composition. The pullulan is available, e.g., from Hayashibara K.K., Japan under the tradenames such as Pullulan PF-10, PF-30 and PI-20, and can be used in the present invention.

It is preferred that a polyhydric alcohol be used as another component in order to adjust the surface tension of the dampening water composition and to provide a humectation property. The polyhydric alcohols include ethylene glycol, diethylene glycol, triethylene glycol, polyethylene glycol and glycerin. For example, preferred polyhydric alcohols have a molecular weight of the order of not more than 1,000. Other additives such as preservatives and surfactants may be optionally added.

The dampening water composition of the present invention can be readily prepared by dissolving the components as described above in water. Alternatively, the components except water may be in the form of a solid or paste or the total concentrations of the components may be increased to prepare a so-called concentrate and diluted with water during use. Of course, the composition may be previously prepared at optimum concentrations required during use.

The preferred ranges of the components of the dampening water composition of the present invention are as shown in the following Table 1. Of course, the composition shown in Table 1 is a preferred composition of the components. The dampening water compositions other than those shown in Table 1 are also naturally included in the present invention so long as they are suitable.

TABLE 1

| Component | Amount added per 1 Kg of Composition | % by weight |
| --- | --- | --- |
| Citric acid | 7–30 g | 0.7–3.0 |
| Sodium citrate | 4–20 g | 0.4–2.0 |
| Ammonium phosphate | 7–30 g | 0.7–3.0 |
| Glucono-delta-lactone | 7–12 g | 0.7–1.2 |
| Gum arabic | 35–40 g | 3.5–4.0 |
| Pullulan | 10–20 g | 1.0–2.0 |
| n-Propyl alcohol | 50–250 g | 5.0–25 |
| Polyethylene glycol | 40–60 g | 4.0–6.0 |
| Preservative | 25–30 g | 2.5–3.0 |
| Propylene oxide-ethylene oxide copolymer | 50–100 g | 5.0–10 |
| Pure water | 408–765 g | 40.8–76.5 |

Examples and Comparative Example illustrate the present invention.

EXAMPLES 1 THROUGH 3 AND COMPARATIVE EXAMPLE 1

The following components were mixed, minor insolubles were filtered to separate them to obtain dampening water compositions of the present invention and Comparative Example (each composition having a pH of 4.5).

TABLE 2

| Component | Ex. 1 | Ex. 2 | Ex. 3 | Comp. Ex. 1 |
| --- | --- | --- | --- | --- |
| Citric acid | 10 g | 10 g | 10 g | 10 g |
| Sodium citrate | 10 g | 10 g | 10 g | 10 g |
| Ammonium phosphate | 10 g | 10 g | 10 g | 10 g |
| Glucono-delta-lactone | 10 g | 0 g | 10 g | 10 g |
| Gum arabic | 35 g | 35 g | 35 g | 35 g |
| Pullulan | 15 g | 15 g | 15 g | 0 g |
| n-Propyl alcohol | 100 g | 100 g | 100 g | 100 g |
| Polyethylene glycol | 50 g | 50 g | 50 g | 50 g |
| Preservative | 20 g | 20 g | 20 g | 20 g |
| Propylene oxide-ethylene oxide copolymer | 80 g | 80 g | 0 g | 80 g |
| Pure water | 660 g | 670 g | 740 g | 675 g |

USE EXAMPLE 1

The above dampening water compositions of Example 1 and Comparative Example 1 were diluted with pure water to dilution of 100, and a printing test was carried out under the following conditions:
 Printing press: B longitudinal plate full size 4/4-color offset rotary press manufactured by Mitsubishi Jukogyo K.K., Japan
 Machine plate: FPQ-III manufactured by Fuji Photo Film K.K., Japan
 Dampening water: solution diluted to a dilution of 100 (each solution having a pH of 5.2)
 Dampening arrangement: continuous feeding-type Dahlgren dampening system
 IPA: none
 Results When the dampening water composition of Comparative Example 1 was used, the ability of the non-image area to retain hydrophilicity was inferior. Accordingly, scumming was liable to be generated. Particularly, at a rise time after rest period (one hour), the filling up of the ink composition and tinting and scumming were observed. Accordingly, the number of spoilage at a rise time after rest was 178 in the case of Example 1 whereas the number of spoilage was 1883 in the case of Comparative Example 1. Thus, in the case of Example 1, the number of spoilage was one-tenth as large as that of Comparative Example 1.

USE EXAMPLE 2

The dampening water composition of Example 2 was diluted with pure water to dilution of 100 (pH of 5.4), and used as in Use Example 1. As with Use Example 1, the dampening water composition of Example 2 was excellent as compared with Comparative Example 1. However, the pH buffering effect was lowered and therefore the pH varied by the components intermixed from the ink composition. Thus, its quality stability was inferior to that of Example 1.

USE EXAMPLE 3

The dampening water composition of Example 3 was diluted with pure water to dilution of 100 (pH of 5.2), and used as in Use Example 1. As with Use Example 1, the dampening water composition of Example 3 was excellent as compared with Comparative Example 1. However, the dynamic surface tension was lowered. Scumming generated unless the amount of water raising was extremely increased (more than 50%). Accordingly, the emulsification of the ink composition was increased, thereby lowering printing quality. Further, quality troubles generated due to water splashing (water dripping) and therefore its quality stability inferior to that of Example 1.

According to the present invention as described above, working environment contamination and exterior environment contamination problems can be solved and printing can be carried out without occurring difficulties such as scumming by using n-propyl alcohol and the specific water-soluble polymer as components of the dampening water composition.

When the dampening water compositions of the present invention were used various continuous feeding-type dampening arrangements other than those described above, similar results were obtained. Thus, it was confirmed that the effect did not vary with the dampening arrangements.

The dampening arrangements confirmed to exert effects were Epic Dampener (manufactured by Epic Corporation), Epic Delta Dampener (manufactured by Epic Corporation), Komorimatjc (manufactured by Komori Insatsuki K.K., Japan), Diamatic (manufactured by Mitsubishi Jukogyo K.K., Japan), Allucalar (manufactured by Heidelberger Druckmaschinen Aktiengesellschaft) and the like.

What is claimed is:

1. A dampening water composition comprising:
water;
a pH buffering agent comprising glucono-delta-lactone;
a water-soluble polymer comprising a propylene oxide-ethylene oxide copolymer and a natural polysaccharide, wherein the natural polysaccharide is pullulan produced from a partially degraded product of starch by a black yeast having the designation Aureobasidium pullulans; and
n-propyl alcohol.

2. The dampening water composition according to claim 1, further comprising a polyhydric alcohol.

3. The dampening water composition according to claim 1, wherein the water-soluble polymer further comprises gum arabic.

4. A dampening water composition comprising, per kilogram of the composition, from 7 to 30 grams of citric acid; from 4 to 20 grams of sodium citrate; from 7 to 30 grams of ammonium phosphate; from 7 to 12 grams of glucono-delta-lactone; from 35 to 40 grams of gum arabic; from 50 to 100 grams of a propylene oxide-ethylene oxide copolymer; from 10 to 20 grams of pullulan produced from a partially degraded product of starch by a black yeast having the designation Aureobasidium pullulans; from 50 to 250 grams of n-propyl alcohol; from 40 to 60 grams of polyethylene glycol; from 25 to 30 grams of a preservative; and water.

* * * * *